Dec. 25, 1923.   　　　A. H. SWEENEY   　　　1,478,538

DECOY STICKUP

Filed March 14, 1923

ALBERT H. SWEENEY   INVENTOR.

BY

Frank Waterfield   ATTORNEY.

Patented Dec. 25, 1923.

1,478,538

UNITED STATES PATENT OFFICE.

ALBERT H. SWEENEY, OF FRESNO, CALIFORNIA.

DECOY STICKUP.

Application filed March 14, 1923. Serial No. 624,903.

*To all whom it may concern:*

Be it known that I, ALBERT H. SWEENEY, a citizen of the United States, and resident of Fresno, in the county of Fresno and State of California, have invented certain new and useful Improvements in Decoy Stickups, of which the following is a specification.

My invention relates primarily to a decoy stickup for use in duck hunting, and comprises means by which the body of a duck which has previously been killed by the hunter may be utilized as a decoy instead of the artificial or imitation duck decoys at present in use, and consists essentially in the provision of supporting means whereby the duck may be supported in a lifelike position to float upon the water.

In the drawings accompanying and forming a part hereof:

Figure 1:
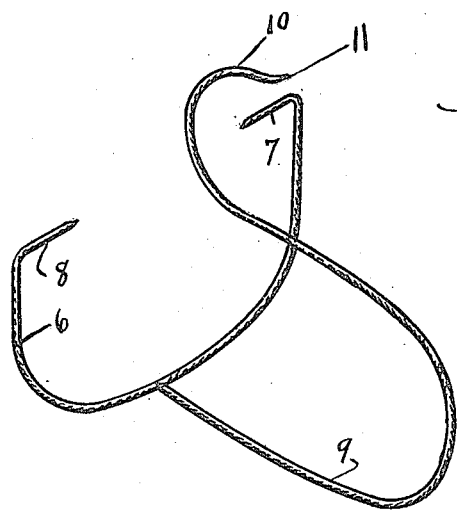
Fig. 1 is a perspective view of my stickup device.

Referring to the drawings, my device comprises a substantially U-shaped wing supporting member 6, preferably formed of spring steel or other suitable resilient material, having its free ends bent to extend inwardly toward each other at right angles, said ends terminating in sharpened points 7 and 8. Rigidly secured at one end to the center of the cross bar of member 6 is the head supporting member 9 which extends forwardly a short distance and is then curved upwardly and rearwardly and terminates in an upwardly and forwardly extending hook member 10 the free end of which terminates in a sharpened point 11. Member 9 is preferably formed of flexible wire or other suitable material which may be bent to conform to the precise configuration of the bird upon which it is to be used to hold the head of the same in its natural position.

Figure 3:
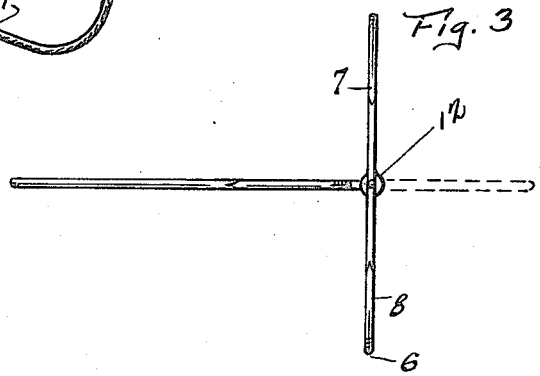
Fig. 3 is a top plan of my device showing another form of construction by means of which the same may be folded for transportation in the pocket of the user.

In Fig. 3 I have shown my device provided with a hinge connection 12 between the wing and head supporting members, whereby the wing supporting member may be turned to lie parallel with the head supporting member for convenient transportation.

Figure 2:
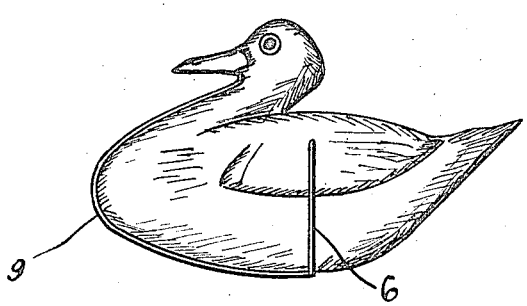
Fig. 2 is a side elevation of my device positioned for use.
Figure 4:
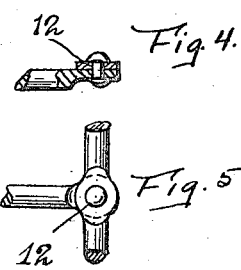
Figs. 4 and 5 are enlarged fragmentary details of the hinge connection of the form shown in Fig. 3.
Figure 5:
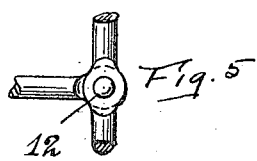

In the use of my device member 6 will first be positioned to hold the wings of the bird in their natural position, as shown in Fig. 2. The head holding member 9 will then be bent to lie snugly along the breast of the bird, the hook portion 10 being bent to fit snugly under the chin with the point 11 imbedded in the flesh of the same to prevent accidental displacement, when the bird will float and act in all respects the same as a natural bird at rest upon the water.

Having described my invention, what I claim is:

1. A decoy stickup comprising a substantially U-shaped wing holding member formed of flexible material, adapted to pass beneath the body of a bird transversely thereof having its free ends terminating in sharpened inturned points to support the wings thereof in their normal position; and a head holding member extending forwardly from said wing holding member around the breast of said bird and terminating in a hook member adapted to engage the chin of said bird to hold the head thereof in its normal position.

2. A decoy stickup comprising a substantially U-shaped flexible wing holding member having the free ends thereof bent to extend inwardly towards each other to form wing supporting members and terminating in sharpened points; a head supporting member extending forwardly from said wing supporting member bent to conform to the breast of a bird and terminating in a hook adapted to fit beneath the chin of said bird having a sharpened point adapted to impinge into said chin to hold the head of said bird in a natural position of rest.

3. A decoy stickup comprising a substantially U-shaped wing holding member and a substantially S-shaped head holding member, said wing holding member having its free ends bent to extend inwardly towards each other and terminating in points, said points being adapted to engage and hold the wings of a dead bird in a natural position; said head holding member being connected at one end to said wing holding member centrally of the cross bar to extend forwardly the required distance and then being bent to extend upwardly and rearwardly to fit snugly around the breast of said bird and then bent to extend upwardly and forwardly beneath the chin and terminating in an upwardly and forwardly extending point adapted to impinge the chin of said bird to hold the same in a natural position of rest.

4. A decoy stickup comprising a substantially U-shaped wing holding member and a substantially S-shaped head holding member, said wing holding member having its free ends bent to extend inwardly towards each other and terminating in points, said points being adapted to engage and hold the wings of a dead bird in a natural position; said head holding member being pivotally connected at one end to said wing holding member centrally of the cross bar to extend forwardly the required distance and then being bent to extend upwardly and rearwardly to fit snugly around the breast of said bird and then bent to extend upwardly and forwardly beneath the chin and terminating in an upwardly and forwardly extending point adapted to impinge the chin of said bird to hold the same in a natural position of rest.

5. A decoy stickup comprising a substantially U-shaped wing supporting member formed from a single piece of flexible material adapted to be mounted to pass transversely beneath the body of a bird and terminating at its free ends in sharpened inturned points; and a head holding member connected at one end to the cross bar of the wing holding member centrally thereof and being shaped to conform to the breast and neck of said bird and terminating in a sharpened forwardly opening hook.

In witness that I claim the foregoing I have hereunto set my hand this 13 day of February, 1923.

ALBERT H. SWEENEY.